United States Patent [19]

Radigan, Jr. et al.

[11] Patent Number: 5,360,472
[45] Date of Patent: Nov. 1, 1994

[54] WATERFAST DYE COMPOSITIONS

[75] Inventors: Edward J. Radigan, Jr., Hamlin; Louis V. Isganitis, Rochester, both of N.Y.; Warren E. Solodar, Montgomery Merion Station, Pa.; Kurt B. Gundlach, Pittsford, N.Y.

[73] Assignee: Xerox Corporation, Stamford, Conn.

[21] Appl. No.: 96,912

[22] Filed: Jul. 26, 1993

Related U.S. Application Data

[63] Continuation-in-part of Ser. No. 992,353, Dec. 17, 1992, Pat. No. 5,254,159.

[51] Int. Cl.$^5$ .............................................. C09D 11/02
[52] U.S. Cl. ........................... 106/22 K; 106/22 H; 534/579; 534/689; 8/673; 8/681
[58] Field of Search ............. 106/22; 534/579, 689; 8/648, 673, 681

[56] References Cited

U.S. PATENT DOCUMENTS

| | | | |
|---|---|---|---|
| 4,359,513 | 11/1982 | Katagiri et al. | 534/689 |
| 4,963,189 | 10/1990 | Hindagolla | 106/22 |
| 5,098,475 | 3/1992 | Winnik et al. | 106/22 |
| 5,120,361 | 6/1992 | Winnik et al. | 106/22 |

FOREIGN PATENT DOCUMENTS

| | | | |
|---|---|---|---|
| 75964 | 4/1984 | Japan | 106/22 K |
| 179155 | 7/1989 | Japan | 534/689 |

*Primary Examiner*—Helene Klemanski
*Attorney, Agent, or Firm*—Judith L. Byorick

[57] ABSTRACT

Disclosed are dye compositions of the formula

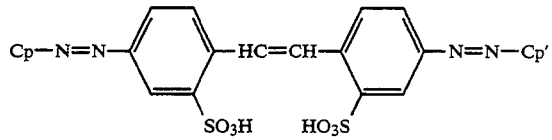

wherein Cp and Cp' are each coupler compounds of the formula

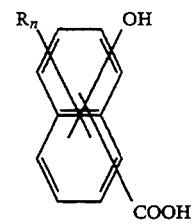

wherein the —COOH group and the —OH group can be in any position on either ring, provided that in the naphthalene ring system there is present least one hydrogen activated through resonance by the —OH group for an electrophilic aromatic substitution coupling reaction, n represents the number of substituents on the rings and is a number of from 0 to 8, and R represents the substituent groups on the ring, wherein each R is independently selected from the group consisting of hydroxyl groups, alkyl groups, substituted alkyl groups, aryl groups, substituted aryl groups, aryl-alkyl groups, substituted aryl-alkyl groups, halogen atoms, and nitro groups. Also disclosed are aqueous ink compositions containing the dyes, processes for making the dyes, processes for making the inks containing the dyes, and printing processes employing the inks.

20 Claims, No Drawings

WATERFAST DYE COMPOSITIONS

This application is a continuation-in-part of copending application U.S. Ser. No. 07/992,353, filed Dec. 17, 1992, now U.S. Pat. No. 5,254,159, entitled "Ink Compositions", the disclosure of which is totally incorporated herein by reference.

BACKGROUND OF THE INVENTION

The present invention is directed to dye compositions. More specifically, the present invention is directed to dye compositions exhibiting waterfast characteristics and suitable for applications wherein waterfast images are desirable, such as ink jet printing. One embodiment of the present invention is directed to dye compositions of the formula

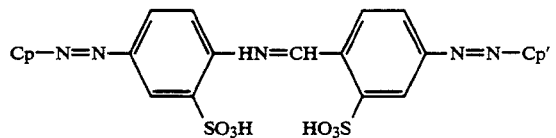

wherein Cp and Cp' are each coupler compounds of the formula

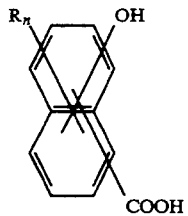

wherein the —COOH group and the —OH group can be in any position on either ring, provided that in the naphthalene ring system there is present least one hydrogen activated through resonance by the —OH group for an electrophilic aromatic substitution coupling reaction, n represents the number of substituents on the rings and is a number of from 0 to 8, and R represents the substituent groups on the ring, wherein each R is independently selected from the group consisting of hydroxyl groups, alkyl groups, substituted alkyl groups, aryl groups, substituted aryl groups, aryl-alkyl groups, substituted aryl-alkyl groups, halogen atoms, and nitro groups. Another embodiment of the present invention is directed to a process for making the aforementioned dye which comprises (a) reacting 4,4'-diamino-2,2'-stilbene disulfonic acid with a base, hydrochloric acid, and a nitrite salt, said reaction taking place in aqueous solution, thereby forming a diazonium intermediate; and (b) reacting the diazonium intermediate with an alkaline aqueous solution containing a coupler compound of the formula

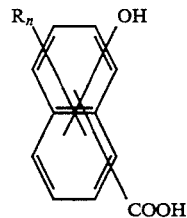

wherein the —COOH group and the —OH group can be in any position on either ring, provided that in the naphthalene ring system there is present least one hydrogen activated through resonance by the —OH group for an electrophilic aromatic substitution coupling reaction, n represents the number of substituents on the rings and is a number of from 0 to 8, and R represents the substituent groups on the ring. Yet another embodiment of the present invention is directed to an ink composition for ink jet printing which comprises an aqueous liquid vehicle and the aforementioned dye composition. Still another embodiment of the present invention is directed to a process for making the aforementioned ink composition which comprises (a) reacting 4,4'-diamino 2,2'-stilbene disulfonic acid with a base, hydrochloric acid, and a nitrite salt, said reaction taking place in aqueous solution, thereby forming a diazonium intermediate; and (b) forming a dye composition by reacting the diazonium intermediate with an alkaline aqueous solution containing a coupler compound of the formula

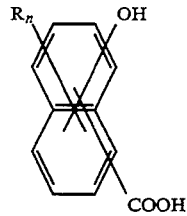

wherein the —COOH group and the —OH group can be in any position on either ring, provided that in the naphthalene ring system there is present least one hydrogen activated through resonance by the —OH group for an electrophilic aromatic substitution coupling reaction, n represents the number of substituents on the rings and is a number of from 0 to 8, and R represents the substituent groups on the ring; and (c) admixing the dye compound with water to form an ink composition. Another embodiment of the present invention is directed to an ink jet printing process which comprises incorporating the aforementioned ink composition into an ink jet printing apparatus and causing droplets of the ink composition to be ejected in an imagewise pattern onto a substrate.

Colorant materials with waterfast characteristics are known. For example, U.S. Pat. No. 5,120,361 (Winnik et al.), the disclosure of which is totally incorporated herein by reference, discloses an ink composition which comprises a solution comprising a dendrimer and a dye or dyes. The ink composition exhibits excellent waterfastness.

U.S. Pat. No. 5,098,475 (Winnik et al.), the disclosure of which is totally incorporated herein by reference, discloses an ink composition comprising a solution with a dendrimer colored with a dye or dyes covalently attached thereto. As optional additives there may be included in the ink humectants and biocides. The aforementioned inks can be prepared by mixing the appropriate components such as a dendrimer, water and a reactive dye. Also disclosed is a process for the utilization of the aforementioned compositions and ink jet printing processes.

U.S. Pat. No. 4,963,189 (Hindagolla) discloses inks comprising (a) a dye corresponding to the formula

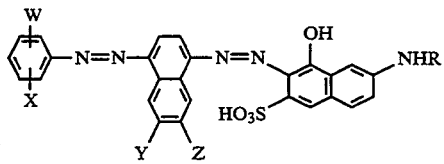

wherein W is COOH, X is H or COOH, Y is H, COOH, or $SO_3H$, Z is H, COOH, or $SO_3H$, and R is H, $CH_2COOH$, or $CH_2CH_2COOH$; with the proviso that there are at least two COOH groups and that the number of COOH groups is equal to or greater than the number of $SO_3$ groups, and (b) a solvent which may be water or a mixture of water and a water-soluble organic solvent. The inks preferably have a pH from about 7 to about 9.5.

Although known compositions are suitable for their intended purposes, a need remains for dye compositions with waterfast characteristics. In addition, there is a need for dye compositions which enable the production of waterfast images when incorporated into aqueous inks. Further, there is a need for waterfast dye compositions suitable for use in ink jet printing applications. Additionally, there is a need for waterfast dye compositions suitable for use in thermal ink jet printing applications. There is also a need for waterfast ink jet ink compositions. In addition, a need remains for waterfast ink jet inks of relatively simple composition, without the need for ink additives to enhance the waterfastness of the ink.

SUMMARY OF THE INVENTION

It is an object of the present invention to provide dye compositions with the above noted advangates.

It is another object of the present invention to provide dye compositions with waterfast characteristics.

It is yet another object of the present invention to provide dye compositions which enable the production of waterfast images when incorporated into aqueous inks.

It is still another object of the present invention to provide waterfast dye compositions suitable for use in ink jet printing applications, Another object of the present invention is to provide waterfast dye compositions suitable for use in thermal ink jet printing applications.

Yet another object of the present invention is to provide waterfast ink jet ink compositions.

Still another object of the present invention is to provide waterfast ink jet inks of relatively simple composition, without the need for ink additives to enhance the waterfastness of the ink.

These and other objects of the present invention (or specific embodiments thereof) can be achieved by providing dye compositions of the formula

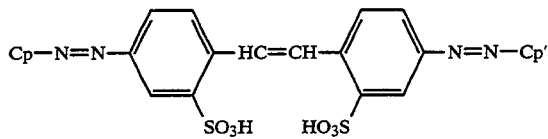

wherein Cp and Cp' are each coupler compounds of the formula

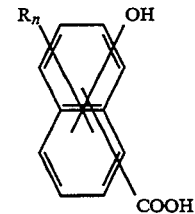

wherein the —COOH group and the —OH group can be in any position on either ring, provided that in the naphthalene ring system there is present least one hydrogen activated through resonance by the —OH group for an electrophilic aromatic substitution coupling reaction, n represents the number of substituents on the rings and is a number of from 0 to 8, and R represents the substituent groups on the ring, wherein each R is independently selected from the group consisting of hydroxyl groups, alkyl groups, substituted alkyl groups, aryl groups, substituted aryl groups, aryl-alkyl groups, substituted aryl-alkyl groups, halogen atoms, and nitro groups. Another embodiment of the present invention is directed to a process for making the aforementioned dye which comprises (a) reacting 4,4'-diamino-2,2'-stilbene disulfonic acid with a base, hydrochloric acid, and a nitrite salt, said reaction taking place in aqueous solution, thereby forming a diazonium intermediate; and (b) reacting the diazonium intermediate with an alkaline aqueous solution containing a coupler compound of the formula

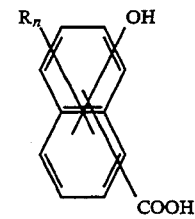

wherein the —COOH group and the —OH group can be in any position on either ring, provided that in the naphthalene ring system there is present least one hydrogen activated through resonance by the —OH group for an electrophilic aromatic substitution coupling reaction, n represents the number of substituents on the rings and is a number of from 0 to 8, and R represents the substituent groups on the ring. Yet another embodiment of the present invention is directed to an ink composition for ink jet printing which comprises an aqueous liquid vehicle and the aforementioned dye composition. Still another embodiment of the present invention is directed to a process for making the aforementioned ink composition which comprises (a) reacting 4,4'-diamino-2,2'-stilbene disulfonic acid with a base, hydrochloric acid, and a nitrite salt, said reaction taking place in aqueous solution, thereby forming a diazonium intermediate; and (b) forming a dye composition by reacting the diazonium intermediate with an alkaline aqueous solution containing a coupler compound of the formula

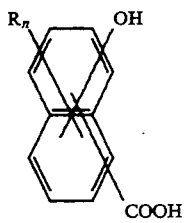

wherein the —COOH group and the —OH group can be in any position on either ring, provided that in the naphthalene ring system there is present least one hydrogen activated through resonance by the —OH group for an electrophilic aromatic substitution coupling reaction, n represents the number of substituents on the rings and is a number of from 0 to 8, and R represents the substituent groups on the ring; and (c) admixing the dye compound with water to form an ink composition. Another embodiment of the present invention is directed to an ink jet printing process which comprises incorporating the aforementioned ink composition into an ink jet printing apparatus and causing droplets of the ink composition to be ejected in an imagewise pattern onto a substrate.

DETAILED DESCRIPTION OF THE INVENTION

The present invention is directed to dye compositions, inks containing the dye compositions, processes for making the dye compositions and inks, and printing processes, wherein the dyes are of the formula

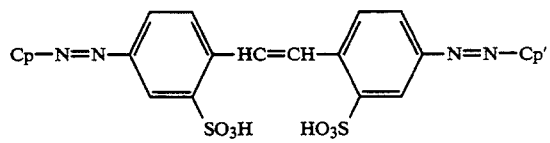

wherein Cp and Cp' are each coupler compounds of the formula

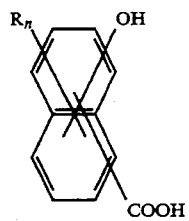

wherein the —COOH group and the —OH group can be in any position on either ring, provided that in the naphthalene ring system there is present least one hydrogen activated through resonance by the —OH group for an electrophilic aromatic substitution coupling reaction, n represents the number of substituents on the rings and is a number of from 0 to 8, and R represents the substituent groups on the ring, wherein each R is independently selected from the group consisting of hydroxyl groups, alkyl groups, preferably with from 1 to about 5 carbon atoms, substituted alkyl groups, preferably with from 1 to about 10 carbon atoms, aryl groups, preferably with from 6 to about 10 carbon atoms, substituted aryl groups, preferably with from 6 to about 10 carbon atoms, aryl-alkyl groups, preferably with from 7 to about 13 carbon atoms, substituted aryl-alkyl groups, preferably with from 7 to about 15 carbon atoms, amine groups, sulfonic acid groups, sulfonate salt groups such as sodium sulfonate, halogen atoms, such as fluorine, chlorine, bromine, and iodine, nitro groups, and the like. Preferably, the orientation about the central C=C bond is trans, as follows:

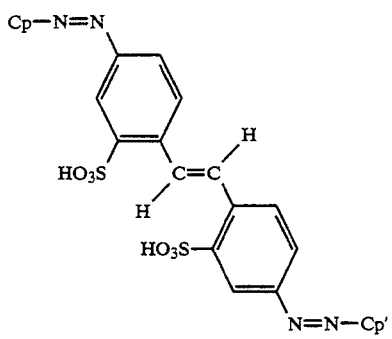

The couplers Cp and Cp' can be either the same as each other or different from each other. Examples of suitable couplers include 3,5-dihydroxy-2-naphthoic acid, of the formula

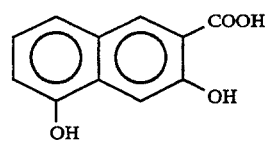

3,7-dihydroxy-2-naphthoic acid, of the formula

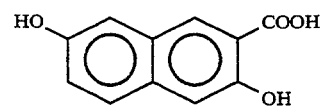

pamoic acid, of the formula

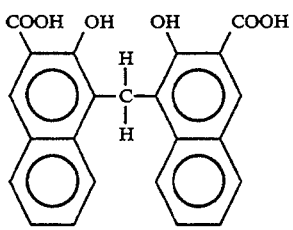

and the like. Coupler compounds of the above formulae and others are commercially available, from, for example, Aldrich Chemical Co., Milwaukee, Wis.

One specific embodiment of the present invention is directed to polymeric dyes, wherein the coupler groups are attached to the central stilbene moiety and are also attached to one or more additional stilbene moieties to form a chain. In general, these dyes are of the formula

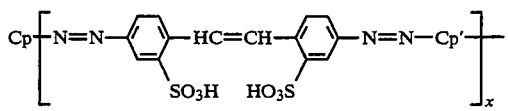

wherein x is an integer of from about 2 to about 20, preferably from about 2 to about 5.

A specific example of a polymeric dye of this type is one with a pamoic acid coupler group, as follows:

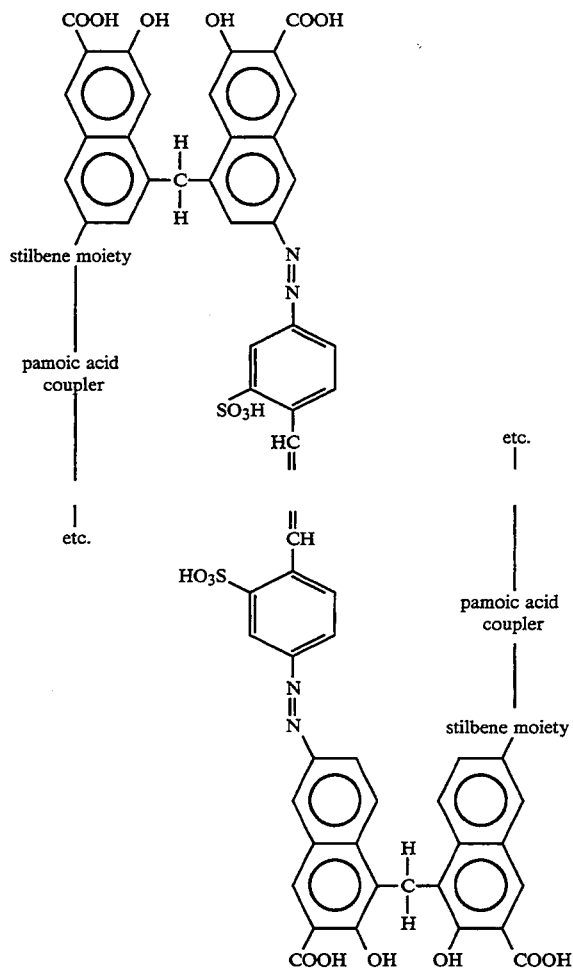

in the instance of dyes made with the pamoic acid coupler or any other coupler capable of forming polymeric linkages, the preparation process determines whether the monomeric or polymeric product is obtained; for example, when a monomeric dye with a pamoic acid coupler is desired, the yield of this product can be maximized by adding the stilbene diazonium salt reactant to the pamoic acid reactant, so that the pamoic acid reactant is initially present in a large excess. Likewise, when a polymeric dye with a pamoic acid coupler is desired, the yield of this product can be maximized by adding the pamoic acid reactant to the stilbene diazonium salt reactant, so that the stilbene diazonium reactant is initially present in a large excess. The relative amounts of reactants employed can also be altered to favor the yield of a monomeric or polymeric product.

The polymeric dyes may become insoluble in aqueous solutions at higher molecular weights; in this instance, the polymeric dye functions as a pigment particle colorant in the ink rather than as a soluble dye colorant. In this instance, it is preferred to include a surfactant in the ink to stabilize the colorant.

The dye compositions are prepared by the following reaction scheme:

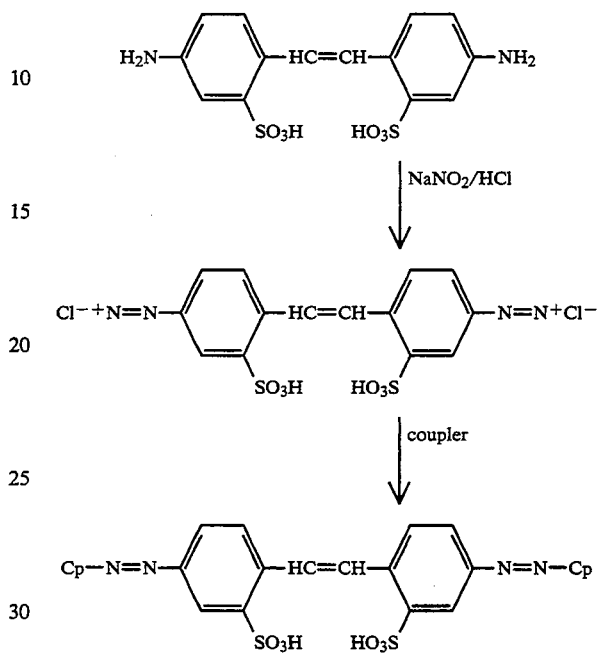

More specifically, one molar equivalent of the 4,4'-diamino-2,2'-stilbene disulfonic acid is dissolved in water with two molar equivalents of base, such as sodium hydroxide (for example, a 10% by weight solution of NaOH in water is a convenient reagent). To the resulting solution is then added two molar equivalents of a nitrite salt, such as sodium nitrite (one molar equivalent for each amine group on the stilbene) (for example, a 10 percent by weight solution of sodium nitrite in water is convenient). The resulting solution is then chilled, and this chilled solution is added all at once to a chilled, stirred solution containing six molar equivalents of HCl (three molar equivalents for each amine group on the stilbene) (for example, a 10% by weight HCl solution in water is convenient). The resulting solution is then stirred cold for an additional 20 to 30 minutes. Thereafter, the solution can be tested with starch iodide paper for the presence of excess nitrous acid. Small amounts of sulfamic acid can be added to destroy any excess $HNO_2$ (which could interfere with the coupling reaction). Subsequently, a solution is prepared containing two molar equivalents of the coupler, also containing enough base (such as NaOH) to neutralize all —COOH groups and all six molar equivalents of HCl added previously, as well as another extra molar equivalent of base to assure an alkaline solution (i.e., of pH higher than about 7.0). The coupler solution is chilled to about 5° C. and the chilled diazonium solution is slowly added dropwise to the coupler solution. Color generally forms immediately. Addition typically takes from about 15 to about 20 minutes. The resulting solution is stirred and maintained cold for about one hour longer. To isolate the dye, the mixture is acidified with concentrated HCl. The dye then precipitates, typically in particles initially so small that they tend to clog filters. To coagulate the precipitate, the solution can either be heated or allowed to stand overnight. Thereafter, the solution is filtered, preferably with suction (for example, using a #1 Whatman paper or a medium porosity sintered glass filter funnel). The precipitate is washed with water (minimizing the amount of water to maximize yield) and then dried. In instances wherein it is desired that Cp be a different coupler group from Cp', reacting a tetrazotized diaminostilbene with a mixture of two couplers (Cp and Cp') yields a mixture of three materials, namely those of the general structure Cp-stilbene-Cp, Cp'-stilbene-Cp', and Cp-stilbene Cp'.

The dye compositions thus prepared can be incorporated into aqueous-based inks. The dyes of the present invention are particularly suitable for thermal ink jet printing, and exhibit high waterfastness, in some instances up to 100 percent.

Ink compositions prepared according to the present invention generally comprise an aqueous liquid vehicle, a dye or mixture of dyes, and optional additional additive components. The liquid vehicle of the inks of the present invention may consist of water, or it may comprise a mixture of water and a miscible organic component, such as ethylene glycol, propylene glycol, diethylene glycols, glycerine, dipropylene glycols, polyethylene glycols, polypropylene glycols, amides, urea, substituted ureas, ethers, carboxylic acids, esters, alcohols, organosulfides, organosulfoxides, sulfones, alcohol derivatives, carbitol, butyl carbitol, cellusolve, ether derivatives, amino alcohols, ketones, N-methylpyrrolidinone, 2-pyrrolidinone, cyclohexylpyrrolidone, hydroxyethers, amides, sulfoxides, lactones, and other water miscible materials, as well as mixtures thereof. When mixtures of water and water miscible organic liquids are selected as the liquid vehicle, the water to organic ratio may be in any effective range, and typically is from about 100:0 to about 30:70, preferably from about 97:3 to about 50:50, although the ratio can be outside this range. The non-water component of the liquid vehicle generally serves as a humectant which has a boiling point higher than that of water (100° C.). In the inks of the present invention, the liquid vehicle (comprising water plus humectant) is generally present in an amount of from about 60 to about 99.5 percent by weight, and preferably from about 75 to about 99 percent by weight, although the amount can be outside of this range. In a particularly preferred embodiment of the present invention, the liquid vehicle comprises a mixture of water and one or more of 2-pyrrolidinone, N-methyl pyrrolidinone, sulfolane, of the formula

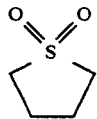

and a polyamine. In ink compositions containing sulfolane, the presence of 2-pyrrolidinone or N-methyl pyrrolidinone, preferably in an amount of from about 1 to about 15 percent by weight, enhances the recoverability of the ink print cartridge to fire ink drops after the printer has been idle (and uncapped) for extended periods of time. Examples of suitable polyamines include N,N'-bis(3-aminopropyl)-1,2-ethylenediamine, 1,4-bis(3-aminopropyl)piperazine, N,N'-bis(3-aminopropyl)-1,3-propanediamine, N,N'-bis(2-aminoethyl)-1,3-propanediamine, N,N'-bis(3-aminopropyl)-1,4-butanediamine (common name spermine), ethylenediamine, diethylenetriamine, triethylenetetramine, tetraethylenepentamine, nitrilotrisethylamine, N,N'-(diaminoethyl)piperazine, piperazinylethylethylenediamine, aminoethyltriethylenetetramine, piperazinylethyldiethylenetriamine, pentaethylenehexamine, first generation dendrimers having terminal primary amine groups, as illustrated in, for example, U.S. Pat. Nos. 5,120,361, 4,507,466, 4,631,337, 4,558,120, 4,568,737, 4,587,329, and D. A. Tomalia, A. M. Naylor, and W. A. Goddard III, *Angewandte Chemie*, Int. Ed. Engl. 29, 138 (1990), C. J. Hawker and J. M. J. Frechet, *J. Am. Chem. Soc.*, 112, 7638 (1990), the disclosures of each of which are totally incorporated herein by reference, and commercially available as STARBURST ® from Dow Chemical Company and Dendrimer Microparticles from Polysciences, Inc., and the like, as well as mixtures thereof. Ink compositions containing these polyamines are disclosed in copending application U.S. Ser. No. 07/992,353, now U.S. Pat. No. 5,259,159 entitled "Ink Compositions," filed Dec. 17, 1992, with the named inventors Kurt B. Gundlach, Geoffrey A. R. Nobes, Marcel P. Breton, and Richard L. Colt, the disclosure of which is totally incorporated herein by reference. Preferably, the liquid vehicle comprises water in an amount of from about 80 to about 90 percent by weight, sulfolane in an amount of from about 5 to about 10 percent by weight, 2-pyrrolidinone or N-methyl pyrrolidinone in an amount of from about 1 to about 10 percent by weight, and the polyamine in an amount of from about 0.05 to about 5 percent by weight, preferably from about 0.2 to about 3 percent by weight, and even more preferably from about 0.4 to about 2.0 percent by weight, although the relative amounts can be outside this range.

The dye is present in any amount effective to obtain the desired color, hue, and intensity. Typically, the dye is present in the ink composition in an amount of from about 1 to about 20 percent by weight, and preferably from about 2 to about 10 percent by weight (wherein the amount refers to the amount of dye molecules present in the ink), although the amount can be outside this range. A mixture of dyes in the proportions desired to obtain a specific shade can also be employed.

Other additives can also be present in the inks. For example, one or more surfactants or wetting agents can be added to the ink. These additives may be of the cationic, anionic, or nonionic types. Suitable surfactants and wetting agents include sodium lauryl sulfate, Tamol ® SN, Tamol ® LG, those of the Triton ® series available from Rohm and Haas Company, those of the Marasperse ® series, those of the Igepal ® series available from GAF Company, those of the Tergitol ® series, and other commercially available surfactants. These surfactants and wetting agents are present in effective amounts, generally from 0 to about 15 percent by weight, and preferably from about 0.01 to about 8 percent by weight, although the amount can be outside of this range.

Polymeric additives can also be added to the inks to enhance the viscosity and the stability of the ink. Water soluble polymers such as Gum Arabic, polyacrylate salts, polymethacrylate salts, polyvinyl alcohols, hydroxy propylcellulose, hydroxyethylcellulose, polyvinylpyrroiidinone, polyvinylether, starch, polysaccharides, and the like are typical polymeric additives. Polymeric additives can be present in the ink of the present invention in amounts of from 0 to about 10 percent by weight, and preferably from about 0.01 to about 5 percent by weight, although the amount can be outside this range.

One example of an additive to the inks is a polymeric additive consisting of two polyalkylene oxide chains bound to a central bispnenol-A-type moiety. This additive is of the formula

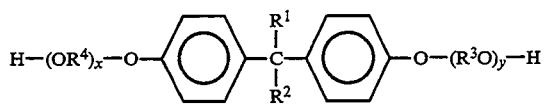

wherein $R^1$ and $R^2$ are independently selected from the group consisting of hydrogen, alkyl groups with from 1 to about 8 carbon atoms, such as methyl, ethyl, propyl, and the like, and alkoxy groups with from 1 to about 8 carbon atoms, such as methoxy, ethoxy, butoxy, and the like, $R^3$ and $R^4$ are independently selected from the group consisting of alkyl groups with from 1 to about 4 carbon atoms, and x and y are each independently a number of from about 100 to about 400, and preferably from about 100 to about 200. Generally, the molecular weight of the polyalkylene oxide polymer is from about 14,000 to about 22,000, and preferably from about 15,000 to about 20,000, although the molecular weight can be outside this range. Materials of this formula are commercially available; for example, Carbowax M20, a polyethylene oxide/bisphenol-A polymer of the above formula with a molecular weight of about 18,000, available from Union Carbide Corporation, Danbury, Conn., is a suitable polymeric additive for the inks of the present invention. In addition, compounds of the above formula can be prepared by the methods disclosed in *Polyethers*, N. G. Gaylord, John Wiley & Sons, New York (1963) and "Laboratory Synthesis of Polyethylene Glycol Derivatives," J. M. Harris, *J. Molecular Science—Rev. Macromol. Chem. Phys.*, C25(3), 325–373 (1985), the disclosures of each of which are totally incorporated herein by reference. The polyalkylene oxide additive is generally present in the ink in an amount of at least about 1 part per million. Typically, the polyalkylene oxide additive is present in amounts of up to 1 percent by weight of the ink, and preferably in amounts of up to 0.5 percent by weight of the ink; larger amounts of the additive may increase the viscosity of the ink beyond the desired level, but larger amounts can be used in applications wherein increased ink viscosity is not a problem. Inks containing these additives are disclosed in U.S. Pat. No. 5,207,825, the disclosure of which is totally incorporated herein by reference.

Other optional additives to the inks include biocides such as Dowicil 150, 200, and 75, benzoate salts, sorbate salts, and the like, present in an amount of from about 0.0001 to about 4 percent by weight, and preferably from about 0.01 to about 2.0 percent by weight, pH controlling agents such as acids or, bases, phosphate salts, carboxylates salts, sulfite salts, amine salts, and the like, present in an amount of from 0 to about 1 percent by weight and preferably from about 0.01 to about 1 percent by weight, or the like.

The ink compositions are generally of a viscosity suitable for use in thermal ink jet printing processes. Typically, the ink viscosity is no more than about 5 centipoise, and preferably is from about 1 to about 2.5 centipoise, although the viscosity can be outside this range.

Ink compositions suitable for ink jet printing can be prepared by any suitable process. Typically, the inks are prepared by simple mixing of the ingredients. One process entails mixing all of the ink ingredients together and filtering the mixture to obtain an ink. Inks can be prepared by preparing a conventional ink composition according to any desired process, such as by mixing the ingredients, heating if desired, and filtering, followed by adding any desired additional additives to the mixture and mixing at room temperature with moderate shaking until a homogeneous mixture is obtained, typically from about 5 to about 10 minutes. Alternatively, the optional ink additives can be mixed with the other ink ingredients during the ink preparation process, which takes place according to any desired procedure, such as by mixing all the ingredients, heating if desired, and filtering.

The present invention is also directed to a process which entails incorporating an ink composition prepared by the process of the present invention into an ink jet printing apparatus and causing droplets of the ink composition to be ejected in an imagewise pattern onto a substrate. In a particularly preferred embodiment, the printing apparatus employs a thermal ink jet process wherein the ink in the nozzles is selectively heated in an imagewise pattern, thereby causing droplets of the ink to be ejected in imagewise pattern. Any suitable substrate can be employed, including plain papers such as Xerox ® 4024 papers, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

A diazonium salt of 4,4'-diamino-2,2'-stilbene disulfonic acid was prepared as follows. An aqueous solution of 10 percent sodium hydroxide was prepared by dissolving 30 grams of solid sodium hydroxide in 270 grams of water. To 23.8 grams of 4,4'-diamino-2,2'-stilbene disulfonic acid (obtained from Eastman Kodak Co., Rochester, N.Y.) was added 60 milliliters of the chilled sodium hydroxide solution with mechanical stirring. The 4,4'-diamino-2,2'-stilbene disulfonic acid began to dissolve, and then precipitated as a salt (thick off-white paste). To the mixture was then added 30 milliliters of water with vigorous stirring. An aqueous solution of 15 percent hydrochloric acid was prepared by admixing 63 milliliters of concentrated hydrochloric acid with 93 grams of water. To the stirring 4,4'-diamino-2,2'-stilbene disulfonic acid mixture in an ice bath was then added 130 milliliters of the cold hydrochloric acid solution, which neutralized the base and left 6 equivalents of acid/stilbene. The resulting opaque tan mixture was vigorously stirred for 20 minutes in an ice bath (7° C.). An aqueous solution of sodium nitrite was prepared by dissolving 8.9 grams of sodium nitrite (obtained from Pfaltz & Bauer, Waterbury, Conn.) in 35 grams of water. The sodium nitrite solution was then added dropwise with a drop funnel over 30 minutes to the tan solution. The solution turned from an opaque tan to an opaque bright yellow-orange. This solution was then stirred in an ice bath for an additional 20 minutes and subsequently tested with starch iodide paper to contain nitrous acid. Thereafter, to the stirring solution was slowly added 0.30 gram of crystalline sulfamic acid (obtained from Aldrich Chemical Co., Milwaukee, Wis.). After 5 minutes, the solution tested free of nitrous acid. Of the 376 grams of solution thus obtained, 188 grams was placed in a 900 milliliter beaker, which was mounted in an ice bath with a mechanical stirrer, and the remaining 188 grams was magnetically stirred in an ice bath.

A monomeric dye having pamoic acid couplers was then prepared as follows. To a 500 milliliter beaker was added 50 grams of pamoic acid (obtained from Aldrich Chemical, Milwaukee, Wis.) and 130 grams of the 10 percent sodium hydroxide solution prepared above, and the solution was magnetically stirred in an ice bath. The pamoic acid was nearly completely dissolved before the solution became extremely viscous. To the stirring solution in the ice bath was added 150 milliliters of water, after which the solution became non-viscous, homogeneous, and clear brown in color. The 350 grams of solution thus obtained was divided in half, with half (175 grams) being placed in a 900 milliliter beaker mounted in an ice bath with a mechanical stirrer.

To the mechanically stirring basic pamoic acid solution (175 grams) was added dropwise by pipet the magnetically stirring stilbene diazonium solution (188 grams). Immediately, the basic pamoic acid solution turned purple-blue. The addition of the entire 188 grams of diazonium solution took place over a 45 minute period, during which the temperature remained at 5° C. and during which no foaming occurred. The solution was stirred for an additional hour before the ice bath melted, after which the pH of the solution was 4.52. A small aliquot was removed, basified by the addition of 10 percent sodium hydroxide to a pH of 8.5, and partially filtered with a sintered glass filter. The filtrate was placed on Courtland 4024 DP, 2016 paper (obtained from Xerox Corporation, Rochester, N.Y.) and dried. After drying, the blue/purple dye appeared to be 100 percent waterfast (smear-proof) on Hammermill Fore DP Long grain paper (obtained from Hammermill Papers). The remaining stirring mixture was adjusted to a pH of 1.57 by the addition of 15 percent hydrochloric acid, and the solution was stirred overnight prior to filtering and washing with 0.075 molar hydrochloric acid solution to remove impurities. The entire partially dried deep blue cake was mixed with 1 liter of water and 5 grams of ammonium carbonate and stirred overnight. Thereafter, the solution was suction filtered and the remaining water was removed with a rotary evaporator to yield 25 grams of bronzed amorphous monomeric dye.

A polymeric dye having pamoic acid couplers was then prepared as follows. To the mechanically stirring solution of stilbene diazonium salt prepared above (188 grams) was slowly added by drop funnel over a 45 minute period the caustic pamoic acid solution (175 grams). The solution remained yellow throughout most of the addition before turning brownish purple by the end. The solution was stirred for an additional hour before the ice bath melted and the color deepened, after which the pH of the solution was 4.52. The dye appeared to be 100 percent waterfast on Hammermill alkaline paper (obtained from Hammermill Papers). The pH of the solution was then adjusted to 1.95 by the addition of 15 percent hydrochloric acid and then stirred slowly overnight, followed by chilling, filtering, and washing the filtrate with 0.075 molar hydrochloric acid to remove impurities. The grey-blue solid was allowed to dry on the filter, yielding 35 grams of product. To 10 grams of the solid was then added 600 milliliters of water and 2 grams of ammonium carbonate. The solution was stirred overnight to complete ionization, after which the resulting red-purple mixture was filtered by suction filtration and the remaining water was removed with a rotary evaporator to yield 8 grams of the bronzed amorphous purified polymeric dye.

EXAMPLE II

A diazonium salt of 4,4'-diamino stilbene disulfonic acid was prepared as follows. An aqueous solution containing 10 percent by weight sodium hydroxide was prepared by dissolving 30 grams of solid sodium hydroxide in 270 grams of distilled water. Thereafter, to 37 grams of stilbene was added about 60 milliliters of the chilled sodium hydroxide solution with external agitation. The stilbene dissolved completely.

A separate solution of chilled concentrated hydrochloric acid (59 grams), distilled water (60 grams), and ice (60 grams) was mixed into a 30 percent solution by mixing. At a temperature of 5° C., the stilbene solution was added, very quickly, to the acid mix with vigorous stirring while the entire mixture was in an ice bath. The addition of the hydrochloric acid solution neutralized the base and left about 6 equivalents of acid/stilbene. The resulting tan opaque mixture was stirred for 30 minutes vigorously at 5° C. An aqueous solution of nitrous acid was prepared by dissolving 13.8 grams of sodium nitrite (obtained from Pfaltz and Bauer) in 50 grams of water. The sodium nitrite solution was then added dropwise with a dropping funnel over 30 minutes to the tan colored solution, upon which the solution turned from an opaque tan to an opaque bright yellow-orange. This solution was stirred in an ice bath for additional 20 minutes and subsequently tested with potassium iodide paper to contain nitrous acid. Thereafter, to the stirring solution was slowly added 0.37 grams of crystalline sulfamic acid (obtained from Aldrich). After 5 minutes the solution tested free of nitrous acid.

The mixture thus obtained (called Mix #1) was divided into four equal quarters and and one quarter of this mixture was added slowly, dropwise over a 30 minute period, to a separate solution of 10.0 grams of 3,7-dihydroxy-2-naphthoic acid (which had first been mixed with 60 grams of 10 percent by weight sodium hydroxide solution). The slow dropwise addition of diazo salt occurred over a 30 minute period. During this addition, some foaming was observed. The resulting material had a black-purple appearance. FThe final pH of this mixture was 0.81. The mixture was allowed to remain static overnight, and was then filtered with dilute acid washing the next day, followed by vacuum drying of the solid product. The final vacuum dried weight of black/strong-purple dye product was 15.24 grams.

EXAMPLE III

A second quarter-portion of Mix #1, prepared as described in Example II, was added slowly dropwise to a separately mixed solution of 10 grams of 3,5-dihydroxy-2-naphthoic acid dissolved in 60 grams of 10 percent by weight sodium hydroxide and chilled to 5° C. The 3,5-dihydroxy-2-naphthoic acid mixture was magnetically stirring in a beaker before addition. The mixture temperature was maintained at 5° C. Upon addition of the diazo salt, the color of the mixture turned blue-black. After 30 minutes of mixing, the final pH of the mixture was 1.65. Thereafter, the mixture was allowed to remain static overnight and was filtered the next day. The resulting solid dye product was washed with dilute hydrochloric acid and further filtered and vacuum dried overnight to a weight of 15.6 grams of black dye product with a slight blue-purple tint.

EXAMPLE IV

Ink compositions were prepared as follows. Each of the dye compositions prepared in Examples II and III were separately admixed with water, sulfolane (obtained from Phillips 66 Co., Bartlesville, Okla.), and 2-pyrrolidone (obtained from GAF Chemicals Corp., Wayne, N.J.) and magnetically stirred for 5 minutes, after which the pH was measured. Thereafter, ammonium carbonate was added, and the pH was again measured. At this stage of the process, each ink was hand coated onto Courtland 4024DP paper (felt side). Subsequently, to each dye solution was added N,N'-bis(3-aminopropyl)-1,2-ethylenediamine (N-BAPED, obtained from Aldrich Chemical, Milwaukee, Wis.), after which the pH was measured. The pH of the inks was then adjusted by the addition of 1.5 Molar sulfuric acid and the pH was again measured, followed by hand coating the inks onto Courtland 4024DP paper (felt side). Specific data for each ink is as follows:

| Ingredient/Measurement | 3,7-dihydroxynaphthoic acid dye (blue) | 3,5-dihydroxynaphthoic acid dye (purple) |
|---|---|---|
| dye | 0.341 g | 0.38 g |
| water | 8.21 g | 8.05 g |
| sulfolane | 0.8 g | 0.8 g |
| 2-pyrrolidone | 0.7 g | 0.7 g |
| first pH measurement | 2.64 | 2.44 |
| ammonium carbonate | 0.1 g | 0.1 g |
| second pH measurement | 8.25 | 8.06 |
| N-BAPED | 0.037 | 0.0395 |
| third pH measurement | 9.19 | 9.11 |
| sulfuric acid (1.5 M) | 4 drops | 3 drops |
| fourth pH measurement | 8.06 | 8.25 |

The papers hand coated with the inks were tested for waterfastness by coating the ink on the felt side of the paper with a #8 wire wound bar to simulate calculated solid area coverage ink deposition quantities by thermal ink jet devices. The coatings were allowed to dry at ambient room conditions for 1 hour prior to measuring visible reflected density with a standard densitometer. The coatings were then submerged in deionized water for 5 minutes with mild stirring. After drying completely at ambient conditions, the visible density was remeasured. The post-soak to pre-soak density ratio was then converted to a percentage, with the following results:

| Ink | Black Filter % WF | Blue Filter % WF | Red Filter % WF | Yellow Filter % WF |
|---|---|---|---|---|
| 3,7 (blue) dye w/o N-BAPED | 82 | 86 | 81 | 67 |
| 3,7 (blue) dye w/ N-BAPED | 100 | 100 | 97 | 91 |
| 3,5 (purple) dye w/o N-BAPED | 80 | 86 | 80 | 62 |
| 3,5 (purple) dye w/ N-BAPED | 89 | 94 | 94 | 92 |

Other embodiments and modifications of the present invention may occur to those skilled in the art subsequent to a review of the information presented herein, these embodiments and modifications, as well as equivalents thereof, are also included within the scope of this invention.

What is claimed is:

1. A dye composition of the formula

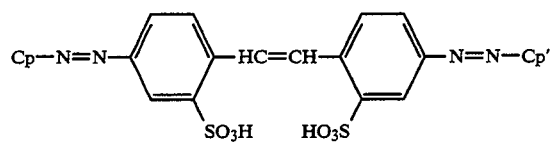

wherein Cp and Cp' are each coupler compounds of the formula

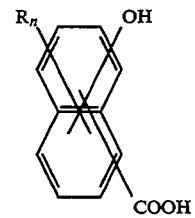

wherein the —COOH group and the —OH group can be in any position on either ring, provided that in the naphthalene ring system there is present at least one hydrogen activated through resonance by the —OH group for an electrophilic aromatic substitution coupling reaction, n represents the number of substituents on the rings and is a number of from 0 to 8, and R represents the substituent groups on the ring, wherein each R is independently selected from the group consisting of hydroxyl groups, alkyl groups, substituted alkyl groups, aryl groups, substituted aryl groups, aryl-alkyl groups, substituted aryl-alkyl groups, amine groups, sulfonic acid groups, sulfonate salt groups, halogen atoms, and nitro groups.

2. A dye composition according to claim 1 wherein Cp and Cp' are independently selected from the group consisting of

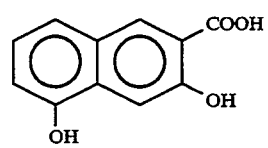

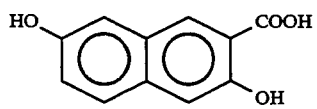

-continued

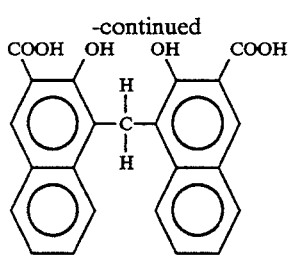

and mixtures thereof.

3. A dye composition according to claim 1 wherein Cp and Cp' are both

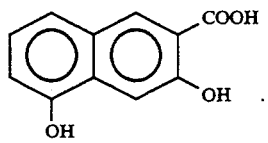

4. A dye composition according to claim 1 wherein Cp and Cp' are both

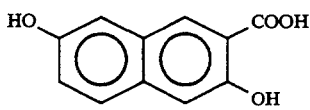

5. A dye composition according to claim 1 wherein Cp and Cp' are both

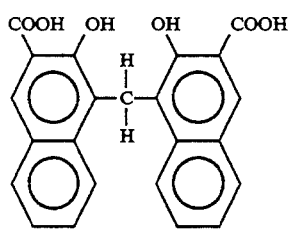

6. A dye composition according to claim 1 wherein the dye is polymeric and is of the formula

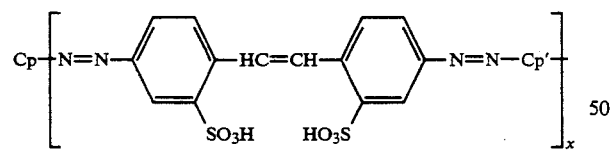

wherein x is an integer of from about 2 to about 20.

7. An ink composition comprising an aqueous liquid vehicle and a dye composition according to claim 1.

8. An ink composition according to claim 7 also containing a polyamine compound.

9. An ink composition according to claim 8 wherein the polyamine is present in an amount of from about 0.05 to about 5 percent by weight.

10. An ink composition according to claim 8 also containing sulfolane.

11. An ink composition according to claim 8 also containing an ingredient selected from the group consisting of 2-pyrrolidone, N-methylpyrrolidone, and mixtures thereof.

12. A process for making a dye composition which comprises (a) reacting 4,4'-diamino-2,2'-stilbene disulfonic acid with a base, hydrochloric acid, and a nitrite salt, said reaction taking place in aqueous solution, thereby forming a diazonium intermediate; and (b) reacting the diazonium intermediate with an alkaline aqueous solution containing a coupler compound of the formula

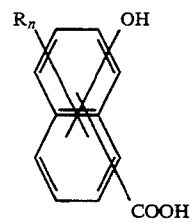

wherein the —COOH group and the —OH group can be in any position on either ring, provided that in the naphthalene ring system there is present at least one hydrogen activated through resonance by the —OH group for an electrophilic aromatic substitution coupling reaction, n represents the number of substituents on the rings and is a number of from 0 to 8, and R represents the substituent groups on the ring, wherein each R is independently selected from the group consisting of hydroxyl groups, alkyl groups, substituted alkyl groups, aryl groups, substituted aryl groups, aryl-alkyl groups, substituted aryl-alkyl groups, amine groups, sulfonic acid groups, sulfonate salt groups, halogen atoms, and nitro groups.

13. A process according to claim 12 wherein 1 molar equivalent of 4,4'-diamino-2,2'-stilbene disulfonic acid is reacted with 2 molar equivalents of base, 6 molar equivalents of hydrochloric acid, and 2 molar equivalents of nitrite salt.

14. A process according to claim 12 wherein the coupler compound is selected from the group consisting of

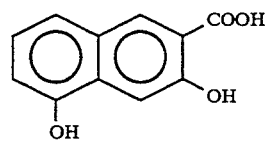

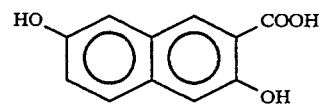

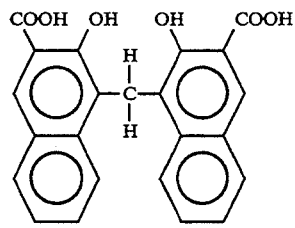

and mixtures thereof.

15. A process for making an ink composition which comprises (a) reacting 4,4'-diamino-2,2'-stilbene disulfonic acid with a base, hydrochloric acid, and a nitrite salt, said reaction taking place in aqueous solution, thereby forming a diazonium intermediate; and (b) forming a dye composition by reacting the diazonium intermediate with an alkaline aqueous solution containing a coupler compound of the formula

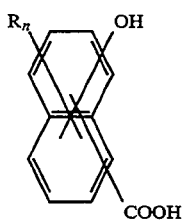

wherein the —COOH group and the —OH group can be in any position on either ring, provided that in the naphthalene ring system there is present at least one hydrogen activated through resonance by the —OH group for an electrophilic aromatic substitution coupling reaction, n represents the number of substituents on the rings and is a number of from 0 to 8, and R represents the substituent groups on the ring, wherein each R is independently selected from the group consisting of hydroxyl groups, alkyl groups, substituted alkyl groups, aryl groups, substituted aryl groups, aryl-alkyl groups, substituted aryl-alkyl groups, amine groups, sulfonic acid groups, sulfonate salt groups, halogen atoms, and nitro groups; and (c) admixing the dye compound with water to form an ink composition.

16. A process according to claim 15 wherein 1 molar equivalent of 4,4′-diamino-2,2′-stilbene disulfonic acid is reacted with 2 molar equivalents of base, 6 molar equivalents of hydrochloric acid, and 2 molar equivalents of nitrite salt.

17. A process according to claim 15 wherein the coupler compound is selected from the group consisting of

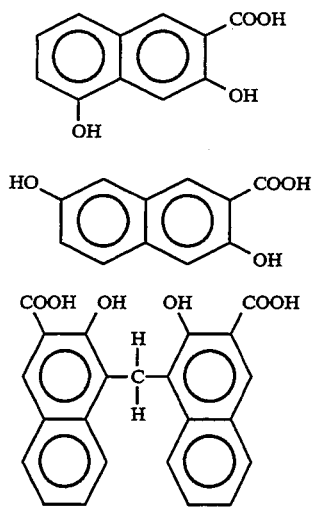

and mixtures thereof.

18. A process according to claim 15 wherein the dye is also admixed with a polyamine compound to form the ink composition.

19. A process according to claim 15 wherein the dye is also admixed with sulfolane to form the ink composition.

20. A process according to claim 15 wherein the dye is also admixed with a material selected from the group consisting of 2-pyrrolidone, N-methylpyrrolidone and mixtures thereof to form the ink composition.

* * * * *